United States Patent
Hu

(10) Patent No.: US 9,092,280 B2
(45) Date of Patent: Jul. 28, 2015

(54) METHOD AND SYSTEM FOR DATA EXCHANGE AND EXCEPTION HANDLING IN A DATA PROCESSING ENVIRONMENT

(75) Inventor: Joseph W. Hu, Lexington, MA (US)

(73) Assignee: Sybase, Inc., Dublin, CA (US)

( * ) Notice: Subject to any disclaimer, the term of this patent is extended or adjusted under 35 U.S.C. 154(b) by 71 days.

(21) Appl. No.: 13/334,349

(22) Filed: Dec. 22, 2011

(65) Prior Publication Data

US 2013/0166630 A1 Jun. 27, 2013

(51) Int. Cl.
*G06F 15/16* (2006.01)
*G06F 9/54* (2006.01)

(52) U.S. Cl.
CPC ...................................... *G06F 9/544* (2013.01)

(58) Field of Classification Search
CPC .... G06F 9/44521; G06F 9/4428; G06F 9/443
USPC ................. 709/210, 203, 204, 205, 217, 219; 719/318, 328, 329
See application file for complete search history.

(56) References Cited

U.S. PATENT DOCUMENTS

| | | | | |
|---|---|---|---|---|
| 5,911,069 | A * | 6/1999 | Beard | 719/315 |
| 5,913,029 | A * | 6/1999 | Shostak | 709/203 |
| 7,197,512 | B2 * | 3/2007 | Pharies et al. | 1/1 |
| 8,356,075 | B2 * | 1/2013 | Balko | 709/204 |
| 8,365,064 | B2 * | 1/2013 | Long | 715/208 |
| 8,463,888 | B1 * | 6/2013 | Boyer et al. | 709/223 |
| 8,756,576 | B2 * | 6/2014 | Balasubramanian | 717/125 |
| 2009/0064184 | A1 * | 3/2009 | Chacko et al. | 719/315 |
| 2009/0077170 | A1 * | 3/2009 | Milburn et al. | 709/203 |
| 2010/0262814 | A1 * | 10/2010 | Pardoe et al. | 712/244 |

OTHER PUBLICATIONS

Sun Microsystems, Inc., "Core J2EE—Transfer Object," Java.Sun. com, accessed at http://java.sun.com/blueprints/corej2eepatterns/Patterns/TransferObject.html, accesed on Mar. 12, 2012, 18 pages.
Adobe Systems, Inc., "BlazeDS," OpenSource.Adome.com, accessed at http://opensource.adobe.com/wiki/display/blazeds/BlazeDS, accessed on Mar. 12, 2012, 1 page.

* cited by examiner

*Primary Examiner* — Viet Vu
(74) *Attorney, Agent, or Firm* — Sterne, Kessler, Goldstein & Fox P.L.L.C.

(57) ABSTRACT

System, method, computer program product embodiments and combinations and sub-combinations thereof for data exchange and exception handling in a data processing environment are described. Aspects include providing a generic data structure to store a value object and a collection of value Objects based upon built-in programming capabilities of a client system and a server system that achieve a rich Internet application experience within a data processing network, and utilizing the generic data structure to exchange data between the client system and the server system of the data processing network. A specialized result form of the generic data structure is also provided and utilized to manage generated exceptions of the data exchanges.

21 Claims, 3 Drawing Sheets

| | Java | Flex |
|---|---|---|
| GVO | Map<String, Object> | Object |
| Collection of GVOs | Collection<Map<String, Object>> | ArrayCollection |

METHOD AND SYSTEM FOR DATA EXCHANGE AND EXCEPTION HANDLING IN A DATA PROCESSING ENVIRONMENT

BACKGROUND OF THE INVENTION

1. Field of the Invention

The present invention relates generally to data processing environments and, more particularly, to a system providing methodology for data exchange and exception handling in a data processing environment.

2. Background Art

The ADOBE® FLEX® software development kit, and BlazeDS server-based Java web components from Adobe Systems, Inc. are considered to provide significant advances in client-server technology. In a multi-tier web application, in which the client is written in ADOBE® FLEX® and the server is written in Java, two-way data exchange, along with exception handling, between client and server is crucial. There are two well-known ways to exchange data between server-side Java and client-side FLEX®. In one approach, data is represented as an XML string, providing the capability of inter-language data exchange. Unfortunately, extra computing cycles are needed to convert an object to XML, and the XML to an object.

Alternatively, the FLEX® framework's Remote Object service can be used to expose a server-side Java object as a RemoteObject, which contains public methods that can be called from a client-side FLEX® application. Data is represented as a Java object on the server side and corresponding ActionScript object on the client side. This FLEX® RemoteObject approach has at least two drawbacks. One drawback is the need to create various classes that extend the FLEX® RemoteObject on both the server and the client side. Also, "Class cast exception" is a common problem that occurs on the FLEX® side when the RemoteObject approach is used, if the same RemoteObject class is instantiated in multiple application domains. An additional drawback occurs as a result of a server-side Java method throwing an exception. When the FLEX® client catches the exception, it gets a FaultEvent object that may contain a stack of nested exceptions. It's very hard to parse the exception stack to extract pertinent error message for display of the error message in a user interface (UI). When the exception stack is deep, it is very difficult to parse it and obtain the real root cause of the exception.

Thus, the known approaches do not provide a simple, yet flexible, mechanism to exchange data both ways between a FLEX®-capable client and a Java-capable server. Further, a robust exception handling system is lacking that smoothly handles exceptions thrown from server to client and overcomes the shortcoming of error handling in the FLEX® programming language. Accordingly, the present invention provides solutions that address such needs.

BRIEF SUMMARY OF THE INVENTION

Briefly stated, the invention includes system, method, computer program product embodiments and combinations and sub-combinations thereof for data exchange and exception handling in a data processing environment. Aspects include providing a generic data structure to store a value object and a collection of value objects based upon built-in programming capabilities of a client system and a server system that achieve a rich Internet application experience within a data processing network, and utilizing the generic data structure to exchange data between the client system and the server system of the data processing network. A specialized result form of the generic data structure is also provided and utilized to manage generated exceptions of the data exchanges.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figures 1, 2:
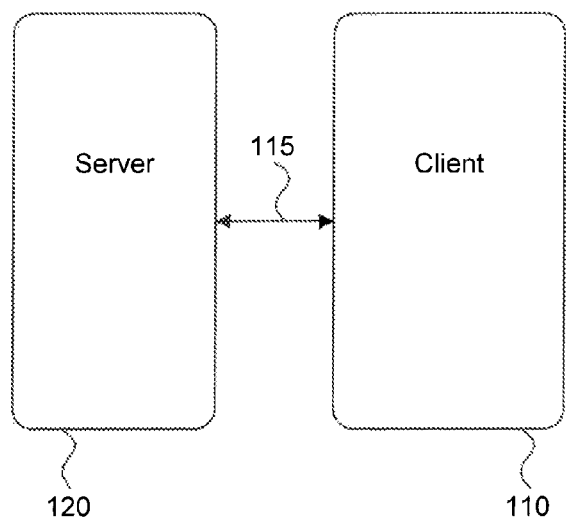
FIG. 1 illustrates a block diagram representation of a system for data exchange and exception handling in accordance with an embodiment of the invention.
FIG. 2 illustrates a representation of a generic data structure for use in the data exchange and exception handling in accordance with an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to system, method, computer program product embodiments and combinations and sub-combinations thereof for data exchange and exception handling in a data processing environment.

FIG. 1 depicts a modular view of a data processing environment 100 performing data exchange and exception handling in accordance with an embodiment of the invention. In operation, a client 110 communicates via a bidirectional connection 115 (e.g., an Internet communication connection) with a server 120. In the exemplary embodiment depicted in FIG. 1, client 110 provides functionality based on the ADOBE® FLEX® software development kit, and operates to exchange data with a server 120, e.g., a BlazeDS server, BlazeDS referring to an Adobe Systems, Inc. open source project that is a server-based Java remoting and web messaging technology that enables developers to easily connect to back-end distributed data and push data in real-time to FLEX® and ADOBE® AIR® applications for more responsive rich Internet application (RIA) experiences, as is well understood in the art.

By way of example, client 110 may act as a resource management client used to monitor a plurality of managed resources and can be implemented on a workstation computer, or alternatively, on a mobile device, such as, but not limited to, a personal digital assistant (PDA), a mobile phone, a smart phone, a hand held computer, a palmtop computer, a tablet computer, a laptop computer, an ultra-mobile PC, or the like. As would be appreciated by one of skill in the relevant arts, a BlazeDS server 120 can be implemented as hardware, software, or a combination of hardware and software and is not precluded from being used with other client platforms.

In such an environment, two-way data exchange and exception handling between client 110 and server 120 is crucial. In accordance with an embodiment of the invention, a simple, yet flexible, mechanism to exchange data between client 110 and server 120 is provided. In addition, a robust exception handling system is provided that smoothly handles exceptions thrown from server 120 to client 110.

In accordance with an embodiment of the invention, an approach to data exchange is provided that uses a generic data structure of a hash map and collection/array to store a value object and collection of value objects, respectively. More particularly, as shown in the diagram of FIG. 2, the generic data structure, referred to herein as a Generic Value Object (GVO) 210, provides a generic hash map with String as keys, and built-in primitive Java data type (such as String, Integer, Boolean, Date, etc.) or another GVO as values. A collection of GVOs 220 is defined as a collection of such hash maps. In FLEX®, a GVO is defined as an ActionScript Object, which can be considered as an associative array with object property names as keys and primitive ActionScript data types (such as String, int, and Boolean) as values. A collection of GVOs in FLEX® is defined as ArrayCollection with each element as a GVO.

Figure 3A:
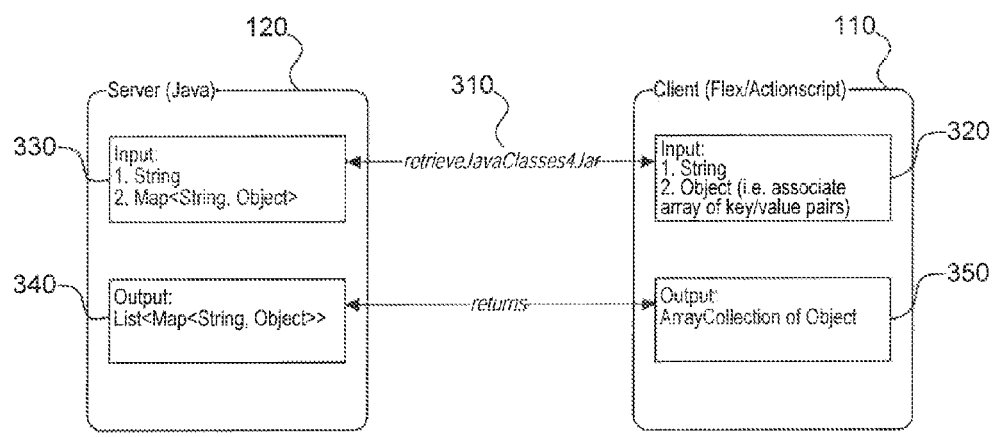
FIGS. 3a and 3b illustrate workflow diagrams for data exchange in accordance with an embodiment of the invention.
Figure 3B:
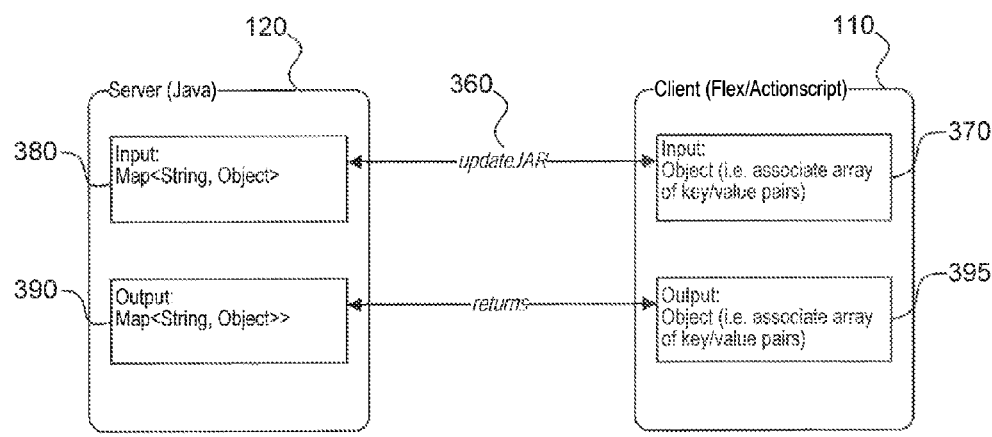

Referring now to FIGS. 3a and 3b, workflows are represented for data exchanges utilizing the generic data structure of FIG. 2 in accordance with an embodiment of the invention. Preferably, data exchange between client-side FLEX® and server-side Java relies upon Adobe BlazeDS running on the server side. In FIG. 3a, a workflow of an example for Java-to-FLEX® data exchange is illustrated. Initially, client 110 invokes a server side method 310, e.g., retreiveJavaClass4Jar, on server 120, with the input parameters 320 of Actionscript String and generic Object. On the server 120 side, the input parameters are automatically converted into Java String and generic Java Map 330, as provided by BlazeDS functionality.

The server 120 then creates an output object 340, which is a List of generic Java Map, and returns it to the client 110. On the client 110 side, the returned object is automatically converted to an Actionscript ArrayCollection of generic Object 350, as provided by BlazeDS functionality.

The following provides sample code for the client 110 side operations for the example of FIG. 3a:

```
[Bindable] private var classesDP:ArrayCollection =
    newArrayCollection( );
private function onShown( ):void
{
    var jarName:String = parentDlg.vo.name;
    MainController.getInstance( ).fetchMODataByGuid(
        this,
        new SimpleResponder(onResultRetrieveClasses,
            onFaultRetrieveClasses),
        parentDlg.vo.guid,
        "retrieveJavaClasses4Jar",
        [[jarName, "java.lang.String"],[{ },"java.util.Map"]]);
}
public function onResultRetrieveClasses(data:Object):void
{
    hideProgressBar( );
    if(data.result != null && data.result.value != null){
        var __vos:ArrayCollection = data.result.value as
            ArrayCollection;
        if(__vos.length > 0){
            classesDP.source = __vos.source;
            // sort the DP by 1st column
            var __sort:Sort = new Sort( );
            sort.fields = [new SortField("name", true)];
            classesDP.sort = __sort;
            classesDP.refresh( );
        }
    }
}
public function onFaultRetrieveClasses(info:Object):void
{
    hideProgressBar( );
    IQClientUtils.handleFaultEvent(null, info as FaultEvent, null,
        true);
}
```

The following provides sample code for the server 120 side operations for the example of FIG. 3a:

```
@Override
public List<Map<String, Object>> retrieve JavaClasses4Jar(String jarName,
        Map<String, Object> injectParamsMap) throws SccSecurityException,
        SQLException, SAException, ClassNotFoundException
{
    return getMainController( ).getJavaEEAdminController( ).
        getJavaClasses4JarAsVOs(jarName,injectParamsMap);
}
public List<Map<String, Object>> getJavaClasses4JarAsVOs(String jarName,
        Map<String, Object> injectParamsMap) throws SQLException,
        SAException, ClassNotFoundException
{
    List<Map<String, Object>> vos = new
        ArrayList<Map<String, Object>>( );
    IQConnection conn = getConnection( );
    if(conn != null) {
        String sql =
            MessageText.format(
                IQSdkConstants.SQL__SELECT__JAVA__CLASSES__FOR__JAR,
                jarName);
        IQResultSet rset = new IQResultSet(conn);
        try {
            try {
                rset.open(sql,JDBCConstants.LONG__QUERY__TIMEOUT);
            } catch(SQLException sqle){
                if(log.isDebugEnabled( )){
                    log.error(sqle.getMessage( ), sqle);
                } else{
                    log.error(sqle.getMessage( ));
                }
```

-continued

```
            throw sqle;
        }
        while(rset.next( )){
            Map<String, Object> vo = new
                Hash.Map<String, Object>( );
            String name = rset.get.ColumnString(4);
            String creator = rset.getColumnString(5);
            Timestamp timeCreated =
                rset.getColumnTimesstamp(10);
            Timestamp timeUpdated =
                rset.getColumnTimestamp(11);
            String comment = rset.getColumnString(12);
            vo.put("name", name);
            vo.put("creator", creator);
            vo.put("jarName", jarName);
            vo.put("timeCreated", timeCreated);
            vo.put("timeUpdated", timeUpdated);
            vo.put("comment", comment);
            if(injectParamsMap != null &&
                !injectParamssMap.isEmpty( ) ){
                vo.putAll(injectParamsMap);
            }
            vos.add(vo);
        }
    }finally{
        if(rset != null){
            rset.close( );
        }
    }
    return vos;
}
```

Referring now to FIG. 3b, a workflow of an example for FLEX®-to-Java data exchange is represented. The process initiates when client 110 invokes a server 120 side method 360, e.g., updateJar, of server 120. On the client 110 side, the input parameter is a generic Actionscript Object 370. On the server 120 side, the input parameter is automatically converted into a generic Java Map 380, as provided by BlazeDS functionality. The server 120 then creates an output object 390 of a generic Map, and returns it to the client 110. On the client 110 side, the returned object is automatically converted to a generic Actionscript Object 395, as provided by BlazeDS functionality.

The following provides sample code for the client 110 side operations for the example of FIG. 3b:

```
override public function onApply( ):Boolean
{
    if (isPageChanged( )){
        comment = txtComment.text;
        setPageChanged(false);
        var updatedProperties:Object = {
            "name": objectName,
            "comment": comment};
        MainController.getInstance( ).fetchMODataByGuid(
            this,
            new SimpleResponder(onSuccessfulApply,
                onUnSuccessfulApply),
            parentDlg.vo.guid,
            "updateJAR",
            [[updatedProperties, "java.util.Map"]]);
    }
    return true;
}
private function onSuccessfulApply(data:Object):void
{
    if(data.result != null && data.result.value != null){
        var resultObject:Object = data.result.value as Object;
        if(resultObject.returnCode ==
            IQConstants.RETURN_CODE_SUCCESS){
            if(parentDlg.orUpdatedCallback != null){
```

-continued

```
                parentDlg.onUpdatedCallback( );
            }
        } else{
            var errorMsg:String = result:Object.message as String;
            set.Message(IQClientUtils.splitIntoLines(errorMsg),
                true);
        }
    }
}
private function onUnSuccessfulApply( data:Object ):void
{
    var errorMsg:String =
        IQClientUtils.extractErrorMessage(data as FaultEvent);
    setMessage(IQClientUtils.splitIntoLines(errorMsg), true);
}
```

The following provides sample code for the server 120 side operations for the example of FIG. 3b:

```
public Map<String, Object> updateJAR(
                Map<String, Object> updatedProperties)
{
    ResultObject ro = null;
    Map<String, Object> _properties =
        IQMAPUtils.convertASObjectToMap(updatedProperties);
    // ask the agent to update jar
    IQAgentMOMBean agentMBean = null;
    try{
        agentMBean = getAgent( );
    }catch(Exception e){
        if(log.isDebugEnabled( )){
            log.error(e.getMessage( ), e);
        } else{
            log.error(e.getMessage( ));
        }
        ro = new ResultObject(ResultObject.ERROR, e.getMessage( ));
        return ro.toMap( );
    }
    if(agentMBean == null){
```

```
        ro = new ResultObject(
            ResultObject.ERROR,
            IQMapMessageSupport.getMessage(
                "can.not.get.agent", getName( )));
        return ro.toMap( );
    }
    Map<String, Object> resultObjectMap = null;
        try{
            resultObjectMap = IQAPUtils.updateJAR(
                agentMBean.getAgentConnectionInfo( ).toVO( ),
                getConnectionInfo( ).toVO( ),_properties);
        }catch(AgentPluginException e){
            ro = new ResultObject(ResultObject.ERROR,
                e.getMessage( ));
            return ro.toMap( );
        }
        return resultObjectMap;
}
```

In accordance with an embodiment, in addition to utilizing the GVO for data exchanges, a special GVO responsible for carrying results and status code from the server 120 to the client 110 is provided and referred to herein as a generic result object (GRO). A status code set to 'ERROR' and an error message embedded within the GRO is returned by the server 120 side process, instead of throwing any exception.

By way of example, in the sample code that follows, for the GRO, a Java class, e.g., ResultObject, is defined that represents a result and status code and has a member data, e.g, 'resultMap', which provides a generic Map object to serve as a container to store the result. A Static method, e.g., ResultObject.toMap( ), turns the object into a generic Map object, and the actual result is another generic Map object stored in the resultMap object with key 'resultMap'.

The following provides sample code for the server 120 side operations for the ResultObject definition:

```
public class ResultObject implements Serializable
{
    static final long serialVersionUID = -279986408484148145L;
    // return code indicating success, error, etc.
    public static final int SUCCESS = 0;
    public static final int ERROR = 1;
    public static final int USER_DEFINED_CODE_MIN = 1000;
    // user defined code should be no less than USER_DEFINED_CODE_MIN.
    public static final String KEY_RETURN_CODE = "returnCode";
    public static final String KEY_MESSAGE = "message";
    public static final String KEY_RESULT_MAP = "resultMap";
    public static final String KEY_RESULT = "result";
    private int returnCode = SUCCESS;
    private String message;
    private Map<String, Object> resultMap;
    // if there is a single result value, the recommended protocol is:
    the value object is stored in key "result"
    public ResultObject(int returnCode, String message){
        this(returnCode, message, null);
    }
    public ResultObject(int returnCode,
                String message,
                Map<String, Object> resultMap)
    {
        this.returnCode = returnCode;
        this.message = message;
        this.resultMap = resultMap;
    }
    public Map<String, Object> toMap( )
    {
        Map<String, Object> vo = new HashMap<String, Object>( );
        vo.put(KEY_RETURN_CODE, new Integer(returnCode));
        if(message != null){
            vo.put(KEY_MESSAGE, message);
        }
        if(resultMap != null) {
            vo.put( KEY_RESULT_MAP, resultMap);
        }
        return vo;
    }
    public static ResultObject createResultObject(
                Map<String,
                    Object resultObjectMap)
    {
        String rcStr =
            resultObjectMap.get(KEY_RETURN_CODE).toString( );
        int rc = ERROR;
        if(rcStr != null){
            rc = Integer.parseInt(rcStr.trim( ));
        }
        ResultObject ro = new ResultObject(
            rc,
            (String)resultObjectMap.get(KEY_MESSAGE),
            (Map<String,Object>)resultObjectMap.get(KEY_RESULT_MAP));
        return ro;
    }
    public int getReturnCode( ) {
```

```
        return returnCode;
    }
    public int setReturnCode(int.returnCode) {
        return this.returnCode = returnCode;
    }
    public String getMessage( ) {
        return message;
    }
    public void appendMessage(String msg){
        message += "\n" + msg;
    }
    public Map<String, Object> getResultMap( ) {
        return resultMap;
    }
}
```

The following provides sample code for the server 120 side operations for using a ResultObject API (application programming interface) to return a GRO to the client 110:

```
public Map<String, Object> retrieveJavaClassNames(String jarFile)
{
    ResultObject ro;
    List<String> classNames = null;
    try{
        classNames =
            JavaEEAdminController.getJavaClassNames(jarFile);
    } catch(Throwable t){
        ro = new ResultObject(
            ResultObject.ERROR, t.getMessage( ));
        return ro.toMap( );
    }
    Map<String, Object> resultMap = new HashMap<String, Object>( );
    resultMap.put(ResultObject.KEY_RESULT, classNames);
    ro = new ResultObject(ResultObject.SUCCESS, "", resultMap);
    return ro.toMap( );
}
```

The following provides sample code for a client 110 side for retrieving the GRO, where the Variable, 'data.result.value', is cast to a generic object, 'resultObject', and the Variable, 'resultObject.resultMap.result', is cast to a generic array collection of generic objects:

```
MainController.getInstance( ).fetchMODataByGuid(
    this,
    new SimpleResponder(onResultRetrieveClasses,
                onFaultRetrieveClasses),
    parentDlg.vo.guid,
    "retrieveJavaClasses4Jar",
    [[jarName, "java.lang.String"],[{ }, "java.util.Map"]]);
private function onResultRetrieveClasses(data:Object:):void
{
    hideProgressBar( );
    if(data.result != null && data.result.value != null){
        var resultObject:Object = data.result.value as Object;
        if(resultObject.returnCode ==
            IQConstants.RETURN_CODE_SUCCESS){
                clearErrorMessage( );
                var classNames:ArrayCollection =
                resultObject.resultMap.result as ArrayCollection;
                if(classNames != null){
                    classesDP = new ArrayCollection( );
                    for each(var name:String in classNames){
                        classesDP.addItem({itemSelected:true,
                                    name: name});
                    }
                }
                onFieldChanged( );
        }
        else{
            var errorMsg:String = resultObject.message as String;
```

```
            setErrorMessage(IQClientUtils.splitIntoLines(errorMsg));
        }
    }
}
private function onUnSuccessfulApply( data:Object ):void
{
    var errorMsg:String = IQClientUtils.extractErrorMessage(data as
        FaultEvent);
    setMessage(IQClientUtils.splitIntoLines(errorMsg), true);
}
```

Through this approach of exception handling in accordance with an embodiment of the invention, the need to parse an exception stack to extract a root cause or pertinent error message is eliminated. Further, the GRO serves as a flexible container of results, status and errors, allowing for increased opportunity to customize its utilization for other status code and error messages, as desired.

Additionally, through the GVO approach to data exchange in accordance with an embodiment of the invention, the burden of defining various RemoteObject classes on both the server and client side, as done in the prior art, is eliminated. As well, there is no need to convert an object to XML and vice versa, as alternatively done in the prior art. Also, with the invention utilizing built-in Java generic classes, such as List, Map, and String, and FLEX® generic classes, such as ArrayCollection and Object, in implementing the GVO, the potential problem of "class cast exception", as commonly known to occur on the FLEX® side for the prior art RemoteObject approach, is solved. Further, through the use of BlazeDS and its Java-to-FLEX® and FLEX®-to-Java object mapping, marshaling and unmarshaling are automatically achieved, as is well appreciated by those skilled in the art.

Figure 4:
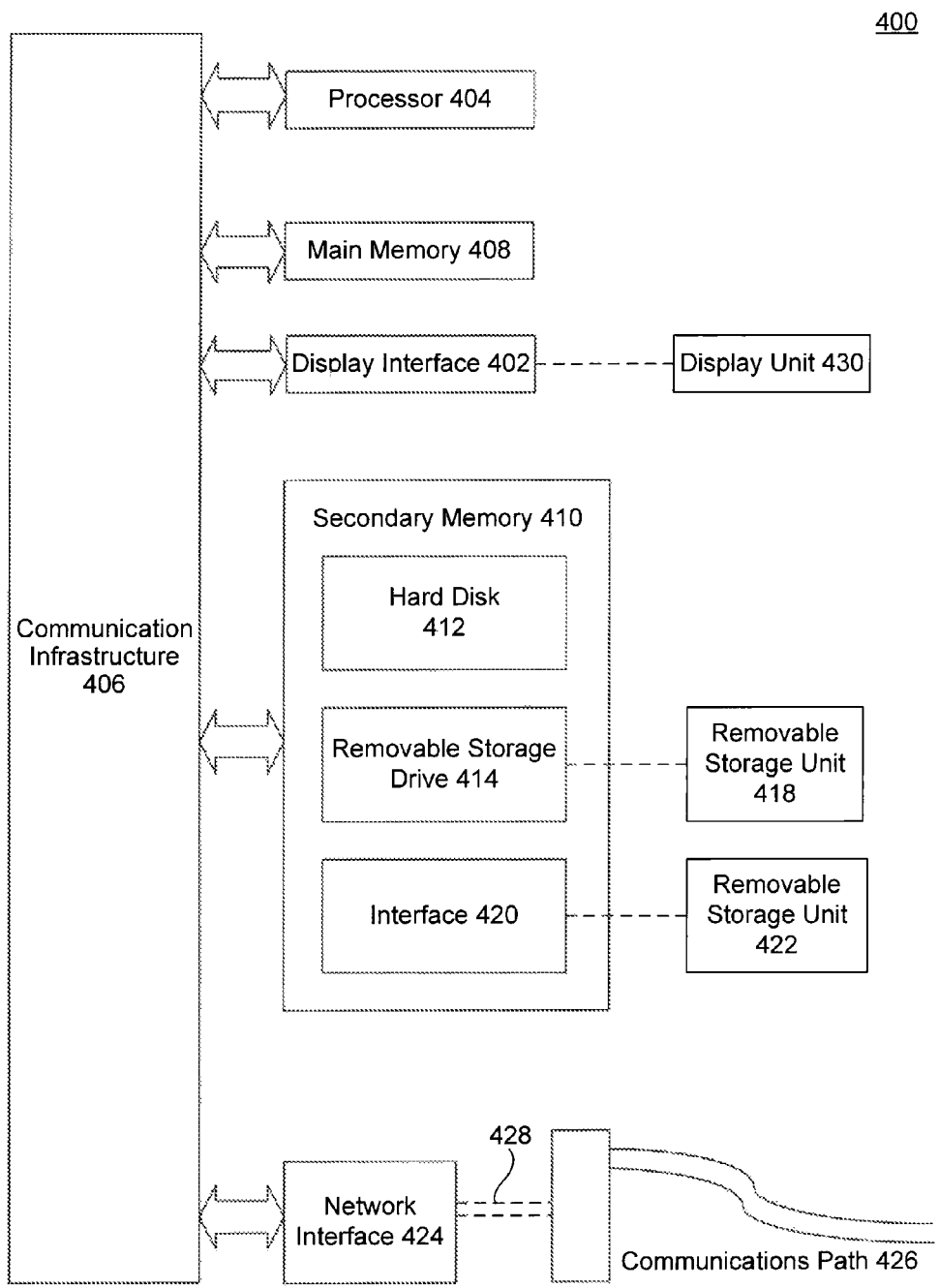
FIG. 4 illustrates an example computer useful for implementing components of embodiments of the invention.

FIG. 4 illustrates an example computer system 400 in which the present invention, or portions thereof, can be implemented as computer-readable code. For example, the methods illustrated by FIGS. 3a and 3b, can be implemented in system 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 404. Processor 404 can be a special purpose or a general purpose processor. Processor 404 is connected to a communication infrastructure 406 (for example, a bus or network).

Computer system 400 also includes a main memory 408, preferably random access memory (RAM), and may also include a secondary memory 410. Secondary memory 410 may include, for example, a hard disk drive 412, a removable storage drive 414, and/or a memory stick. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art(s), removable storage unit 418 includes a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Signals carried over communications path 426 can also embody the logic described herein. Computer program medium and computer usable medium can also refer to memories, such as main memory 408 and secondary memory 410, which can be memory semiconductors (e.g. DRAMs, etc.). These computer program products are means for providing software to computer system 400.

Computer programs (also called computer control logic) are stored in main memory 408 and/or secondary memory 410. Computer programs may also be received via communications interface 424. Such computer programs, when executed, enable computer system 400 to implement the present invention as discussed herein. In particular, the computer programs, when executed, enable processor 404 to implement the processes of the present invention, such as the methods illustrated by FIGS. 3a and 3b. Accordingly, such computer programs represent controllers of the computer system 400. Where the invention is implemented using software, the software may be stored in a computer program product and loaded into computer system 400 using removable storage drive 414, interface 420, hard drive 412 or communications interface 424.

The invention is also directed to computer program products comprising software stored on any computer usable medium. Such software, when executed in one or more data processing device, causes a data processing device(s) to operate as described herein. Embodiments of the invention employ any computer usable or readable medium, known now or in the future. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. It should be appreciated that while embodiments of the invention are described herein with reference to FLEX® and Java, such description is provided for purposes of illustration, not limitation. Embodiments of the invention are applicable and can be used with other user interface development platforms and languages operating similarly, now existing or developed in the future. Further used herein, in an embodiment, the term "server" may be implemented as collection of servers such as a server farm or server cluster. For example, a database server may be a commercially available server machine with one or more central processing units (CPUs). Alternatively, a database server may comprise multiple computing devices and/or computing functionality hosted on multiple server machines (i.e., a server farm).

Accordingly, the breadth and scope of the present invention should not be limited by any of the above-described exemplary embodiments, but should be defined only in accordance with the following claims and their equivalents.

What is claimed is:
1. A method for data exchange and exception handling comprising:
   providing a generic data structure to store a value object and an array comprising a collection of value objects based upon built-in programming capabilities of a client system and a server system that achieve an Internet application experience within a data processing network, wherein the generic data structure is configured to facilitate two-way data exchange between the client system and the server system, and wherein the generic data structure comprises a generic hash map with String as keys and a built-in primitive data type;
   utilizing the generic data structure to exchange data between the client system and the server system of the data processing network;
   providing a specialized result form of the generic data structure, wherein the specialized result form includes a status code, wherein the status code is configured to indicate whether an error has occurred or whether an error has not occurred; and
   utilizing the specialized result form to carry results and the status code from the server system to the client system and wherein the specialized result form is configured to allow management of generated exceptions of the data exchanges without throwing an exception.

2. The method of claim 1 further comprising utilizing the specialized result form to communicate at least one of result data, status data, and error message data.

3. The method of claim 1 wherein the generic data structure stores a generic hash map representing at least one of an object and a generic collection of generic hash maps representing multiple objects for a Java-capable server system.

4. The method of claim 3 wherein the generic data structure stores an associative array representing at least one of an object and an array of associative arrays representing multiple objects for a client system.

5. The method of claim 4 further comprising automatically converting data between the generic hash map and the associative array.

6. The method of claim 5 further comprising utilizing client system functionality to perform the automatic conversion.

7. A system for data exchange and exception handling in a data processing network comprising:
at least one client system; and
at least one server system, wherein
the at least one client system and at least one server system have built-in programming capabilities that achieve an Internet application experience and are configured to exchange data by:
utilizing a generic data structure that stores a value object and an array comprising a collection of value objects based upon the built-in capabilities, and
managing generated exceptions of the data exchanges by utilizing a specialized result form of the generic data structure that includes a status code, wherein the specialized result form is configured to carry results and the status code from the server system to the client system and to allow managing the generated exceptions of the data exchanges without throwing an exception,
wherein the status code is configured to indicate whether an error has occurred or whether an error has not occurred,
wherein the generic data structure is configured to facilitate two-way data exchange between a client and a server, and
wherein the generic data structure comprises a generic hash map with String as keys and a built-in primitive data type.

8. The system of claim 7 wherein the specialized result form communicates at least one of result data, status data, and error message data.

9. The system of claim 7 wherein the generic data structure stores a generic hash map representing at least one of an object and a generic collection of generic hash maps representing multiple objects for a Java-capable server system.

10. The system of claim 9 wherein the generic data structure stores an associative array representing at least one of an object and an array of associative arrays representing multiple objects for a client system.

11. The system of claim 10 wherein conversion between the generic hash map and the associative array occurs automatically.

12. The system of claim 11 wherein conversion occurs automatically through client system functionality.

13. A computer program product having a non-transitory computer readable medium configured to store control logic that enables a processor to perform data exchange and exception handling, the control logic comprising:
computer readable code enabling a processor to:
provide a generic data structure to store a value object and an array comprising a collection of value objects based upon built-in programming capabilities of a client system and a server system that achieve an Internet application experience within a data processing network, wherein the generic data structure is configured to facilitate two-way data exchange between the client system and the server system, and wherein the generic data structure comprises a generic hash map with String as keys and a built-in primitive data type;
utilize the generic data structure to exchange data between the client system and the server system of the data processing network;
provide a specialized result form of the generic data structure, wherein the specialized result foam includes a status code, wherein the status code is configured to indicate whether an error has occurred or whether an error has not occurred; and
utilize the specialized result form to carry results and the status code from the server system to the client system and wherein the specialized result form is configured to allow management generated exceptions of the data exchanges without throwing an exception.

14. The computer program product of claim 13 wherein to utilize the specialized result from further comprises communicating at least one of result data, status data, and error message data.

15. The computer program product of claim 13 wherein the generic data structure stores a generic hash map representing at least one of an object and a generic collection of generic hash maps representing multiple objects for a Java-capable server system.

16. The computer program product of claim 15 wherein a generic data structure stores an associative array representing at least one of an object and an array of associative arrays representing multiple objects for a client system.

17. The computer program product of claim 16 further comprising computer readable code enabling a processor to automatically convert data between the generic hash map and the associative array.

18. The computer program product of claim 17 wherein to automatically convert utilizes client system functionality.

19. The method of claim 1, wherein the client system has a first set of programming capabilities and the server system has a second set of programming capabilities.

20. The method of claim 19, wherein the generic data structure is generic to both of the first and second sets of programming capabilities.

21. The method of claim 1, wherein providing the specialized result form further comprises embedding an error message within the specialized result form when the status code indicates an error has occurred.

* * * * *